United States Patent
Miyahara

[11] Patent Number: 6,129,237
[45] Date of Patent: Oct. 10, 2000

[54] STRUCTURE FOR OPENING/CLOSING A CASE COVER

[75] Inventor: Akihiro Miyahara, Kunitachi, Japan

[73] Assignee: Casio Computer Co., Ltd., Tokyo, Japan

[21] Appl. No.: 09/192,901

[22] Filed: Nov. 16, 1998

[30] Foreign Application Priority Data

Dec. 8, 1997 [JP] Japan .................................... 9-352015

[51] Int. Cl.[7] .......................... B65D 43/16; B65D 43/20; B65D 43/22
[52] U.S. Cl. ......................... 220/812; 220/4.02; 220/255; 220/315; 220/813; 220/815; 220/826; 220/830
[58] Field of Search ................................... 220/4.02, 812, 220/255, 263, 264, 324, 326, 810, 811, 813, 815, 817, 819, 826, 827, 830, 831, 832, 833, 834, 835, 843, 345.1, 345.2, 348, 345.3, 315

[56] References Cited

U.S. PATENT DOCUMENTS

| | | | |
|---|---|---|---|
| 4,684,017 | 8/1987 | Watanabe et al. | 220/817 X |
| 4,705,187 | 11/1987 | Linn | 220/819 |
| 4,717,020 | 1/1988 | Viira | 220/349 X |
| 4,735,309 | 4/1988 | Nemeth | 220/815 X |
| 4,775,075 | 10/1988 | Kamin et al. | 220/815 |
| 5,078,159 | 1/1992 | Yuhara | 220/817 X |
| 5,248,057 | 9/1993 | Taylor | 220/819 |
| 5,325,984 | 7/1994 | Ady et al. | 220/812 |
| 5,353,947 | 10/1994 | Zinnbauer et al. | 220/812 |
| 5,465,862 | 11/1995 | Devlin | 220/830 |
| 5,678,693 | 10/1997 | Tapp et al. | 220/819 X |

*Primary Examiner*—Stephen P. Garbe
*Assistant Examiner*—Niki M. Eloshway
*Attorney, Agent, or Firm*—Frishauf, Holtz, Goodman, Langer & Chick, P.C.

[57] ABSTRACT

A structure for opening/closing a cover for a case in which when the cover is closed, the cover closes an opening provided in an upper surface of the case, whereas when the cover is opened, the cover is guided at its engaging portions in guides provided on the case, so that the cover is folded in halves upward at a connection, the folded cover is moved by a movable element via one end of the case to below the case and then disposed there. For example, a cover 11 foldable in halves at a first hinge 14 is provided turnably by a second hinge 17 to a turnable plate 16 which is provided turnably by a third hinge 18 to a right-hand end of a device case 1. A pair of guide grooves 19 is provided on a device case 1 such that the pair of guide grooves extends to guide a corresponding pair of engaging pins 20 provided at a left-hand end of the cover 11 from a left-hand end of the upper surface of the case 1 to near a lower right-hand end of the case 1. When the cover 11 is opened, the engaging pins 20 are guided along the guide grooves 19 to fold the cover in halves. The folded cover 11 is then moved to below the case 1 via the right-hand end of the case 11 by the turnable plate 16 and then disposed below the case 1. Thus, when the cover is opened, it neither becomes an obstacle nor dangles. Thus, this structure improves handiness.

13 Claims, 9 Drawing Sheets

STRUCTURE FOR OPENING/CLOSING A CASE COVER

FIELD OF THE INVENTION

The present invention relates to a structure for opening/closing a cover for a case.

BACKGROUND ART

Conventionally, in a mobile or portable electronic device, a display unit is provided within a case for the device to display information. The display unit is exposed through an opening provided in an upper surface of the device. The opening is closed with an openable cover to protect the display unit.

In the structure for opening/closing the cover for the device, conventionally, a flat cover is hinged at one edge on an end of the device case so as to close the opening in the case.

In such structure, however, the cover is hinged on the case, so that when the cover is opened to use the device, it can be an obstacle and dangle. Thus, it is not handy.

It is an object of the present invention to provide a cover structure in which when the cover is open, it neither becomes an obstacle nor dangles.

SUMMARY OF THE INVENTION

In order to achieve the above object, according to the present invention, there is provided a structure for opening/closing a cover for closing an opening in an upper surface of a case, wherein:

the cover is foldable in halves around a connection and having one end and the other end; and comprising:

movable means provided at an end of the case and to which the cover is provided movably at its one end;

engaging means provided at the other end of the cover for engaging slidably with the case; and guide means provided on the case for guiding the engaging means along an upper surface of the case and the one end of the case;

whereby the case is folded in halves upward at the connection as the engaging means is guided by the guide means, moved to below the case via the end of the case by the movable means, and then disposed below the case.

Thus, according to the present invention, when the cover is closed, the cover shuts the opening in the upper surface of the case whereas the when the cover is opened, it is guided at the engaging means by the guide means on the case to be folded in halves upward by the connection from the case, moved to below the case through the one edge of the case by the movable means, and then disposed below the case. Thus, when the cover is opened, it neither becomes an obstacle nor dangles. Therefore, this structure renders handy the structure for opening/closing the cover for the device case.

A BEST MODE FOR CARRYING OUT THE INVENTION

Referring to FIGS. 1–9, a first embodiment of the present invention directed to a structure for opening/closing a cover for an electronic device will be described next.

Figure 4:
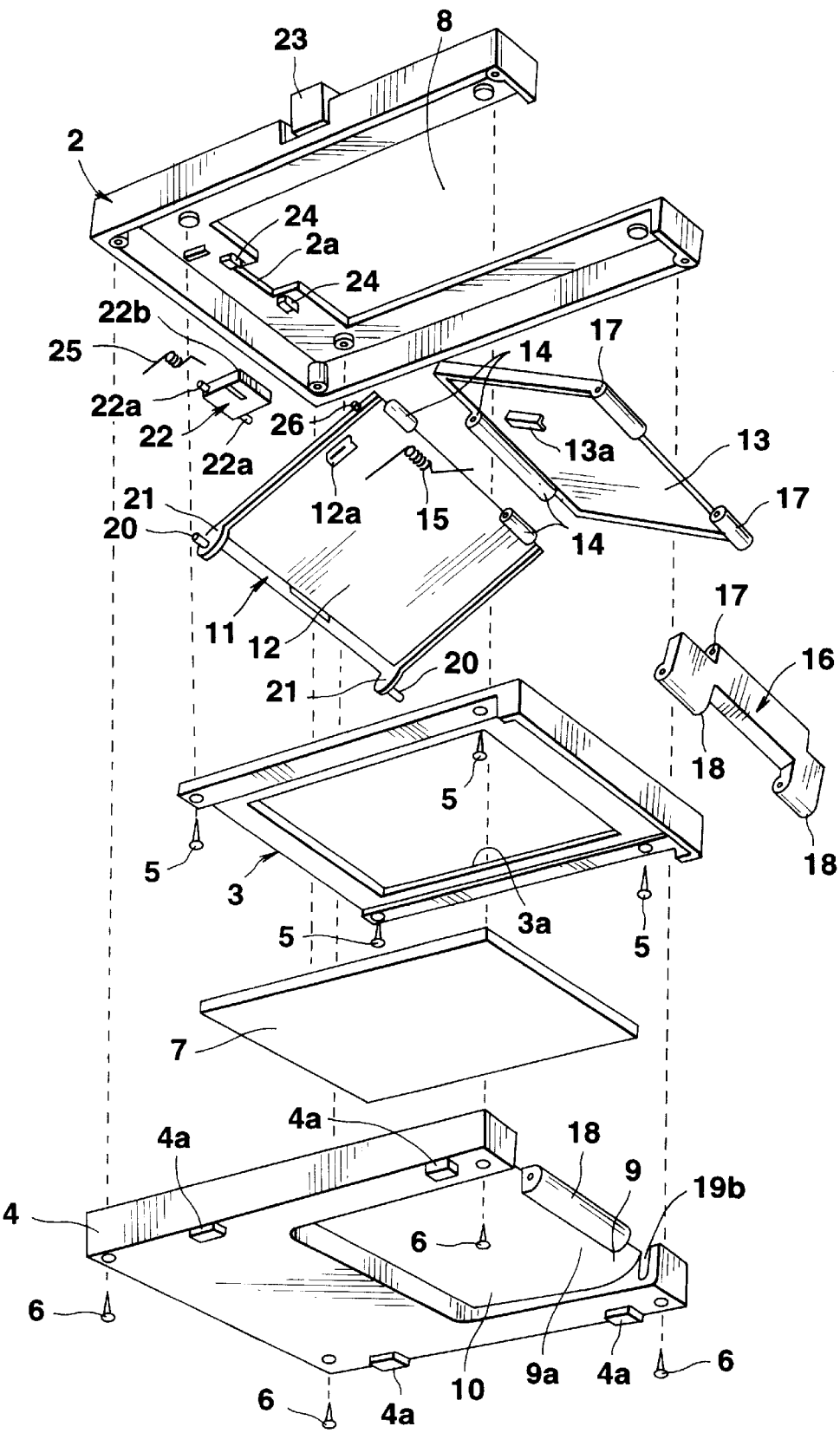
FIG. 4 is an exploded view of the device.

The electronic device is, for example, a mobile data processor with a case 1, which includes, as shown in FIG. 4, an upper subcase 2, a middle subcase 3, and a lower subcase 4 with the middle subcase 3 being attached by screws 5 in the upper subcase 2 and with the lower subcase 4 being attached by screws 6 to a lower edge of the upper subcase 2.

In this case, the middle subcase 3 has an opening 3a at its center with a display unit 7, for example, of a liquid crystal type being provided so as to align with the opening 3a between the middle and lower subcases 3 and 4. An opening 8 aligning with the display unit 7 is provided a right-hand portion of the upper subcase 2 in FIG. 4. An attaching recess 9 corresponding to the right-hand end of the opening 8 in the upper subcase 2 is provided in the right-hand end of the lower subcase 4. The middle subcase 3 abuts at a lower edge of its right-hand end on an upper end of the recess 9. A receiving recess 10 continuing to the recess 9 is provided on the lower surface of the lower subcase 4. A tilt surface 9a is provided to a lower end of the recess 9 with four spaced supports 4a on the lower surface of the lower subcase 4.

A cover 11 is provided openably for covering the opening 8 in the upper subcase 2. More particularly, in the cover 11, a first cover half 12 and a second cover half 13 are connected turnably by a first hinge (connection) 14 so as to be folded.

In this case, a torsion or biasing spring 15 is provided in the vicinity of the first hinge 14 so that the torsion spring 15 is fixed at one end to an engaging lug 12a provided on an inner surface of the first cover half 12 and fixed at the other end to an engaging lug 13a provided on an inner surface of the second cover half 13. Thus, the first hinge 14 is biased so as to fold the cover 11 upward from the upper subcase 2.

As shown in FIG. 4, the cover 11 or hence the second cover half 13 is provided at its right-hand end by a second hinge 17 to an upper end of a turnable plate 16 provided at the right-hand end of the case 1. More particularly, the turnable plate 16 is provided turnably at its lower end by a third hinge 18 to the attaching recess 9 on the lower subcase 4 corresponding to the right-hand end of the case 1. The turnable plate 16 has a thickness which substantially corresponds to the depth of the recess 9 on the lower subcase 4 so that when the turnable plate 16 is turned upward around the third hinge 18, the second hinge 17 is positioned on an upper end of the upper subcase 2 whereas when the turnable plate 16 is turned downward, it abuts on the tilt surface 9a at the lower end of the recess 9 so that the second hinge 17 is positioned in the recess 10 on the lower subcase 4.

A pair of engaging pins 20 is provided at a left-hand end of the cover 11 or first cover half 12 so as to protrude laterally outward from a corresponding pair of lugs 21 each provided on a respective one of opposite extremes of the left-hand end of the first cover half 12, and is slidably received in a corresponding pair of guide grooves 19 (FIGS. 2, 3) provided on a corresponding pair of opposite inner sides of the case 1. Each guide groove 19 is composed of a horizontal groove portion 19a provided between the upper and middle subcases 2 and 3 and a vertical groove portion 19b provided through the right-hand ends of the upper and lower subcase 2 and 4 so as to continue to the horizontal groove portion 19b. More particularly, the horizontal groove portions 19a extend horizontally between the left-hand and right-hand ends of the case 1 and between the upper and middle subcases 2 and 3 whereas the vertical groove portions 19b extend vertically from the upper subcase 2 at the right-hand ends of the upper and lower subcases 2 and 4 on opposite sides of the opening 8 in the upper subcase 2 along opposite sides of the recess 9 on the lower subcase 4 through opposite sides of the third hinge 18 to the vicinity of the lower end of the lower subcase 4. The lugs 21 are provided for preventing the first cover half 12 from abutting at its left-hand end on the third hinge 18 when the engaging pins 20 pass by the opposite sides of the third hinge 18.

Provided in the vicinity of the left-hand end of the upper surface of the case 1 and hence the upper subcase 2 is a hook 22 which is engaged with a left-hand end of the first cover half 12 when the cover 11 closes the opening 8 in the upper subcase 2. Provided at a midpoint of one side of the upper subcase 2 is a locker 23 which locks the cover 11 in a closed state.

As shown in FIG. 4, the hook 22 is disposed in a cut 2a provided at a left-hand end of the opening 8 in the upper subcase 2 so that when a hook axle 22a is supported rotatably by a pair of attachments 24 provided on a lower surface of the upper subcase 2, the hook 22 is biased so as to turn upward by a spring 25 and hence a raise 22b provided on top of a free end of the hook 22 is engaged releasably with the left-hand end of the first cover half 12. The resiliency of the spring 25 is set so as to be smaller than that of the torsion spring 15 for the cover 11.

The locker 23 is provided somewhat slidably on the right-hand side of the upper subcase 2 in the vicinity of its midpoint and hence the boundary between the first and second cover halves 12 and 13 (as viewed in FIG. 1) so that when the cover 11 is extended against the resiliency of the torsion spring 15 to close the opening 8 in the upper subcase 2, the cover 11 suppresses a protrusion 26 provided on a side of the first cover half 12 to prevent the first and second cover halves 12 and 13 from floating against the resiliency of the torsion spring 15 to thereby lock the cover 11.

A protrusion (not shown) which is engaged releasably in a recess (not shown) provided on a side of the second cover half 13 when the folded cover 11 is received in the recess 10 is provided in the receiving recess 10 provided on the lower surface of the lower subcase 4.

Figure 1:
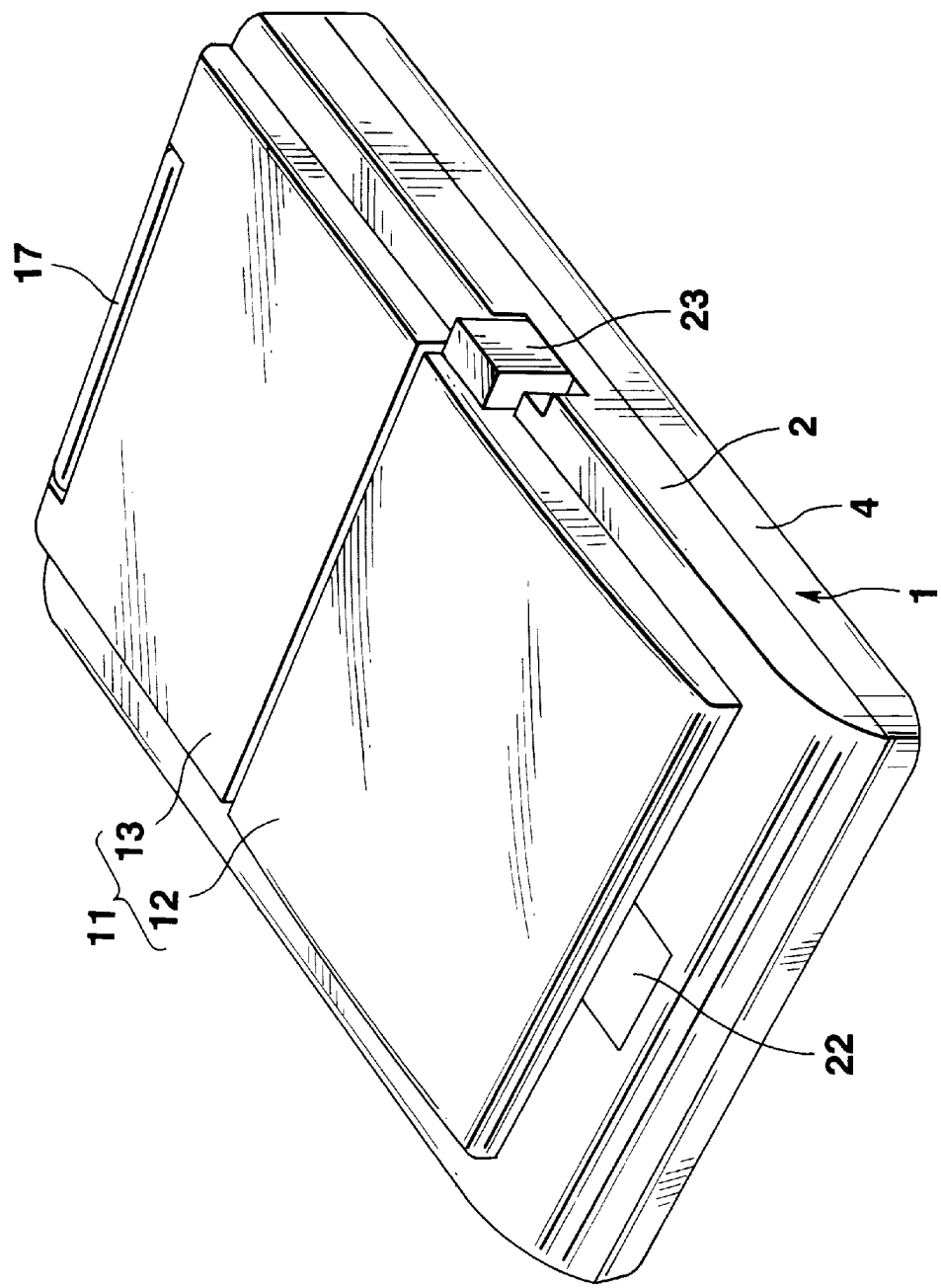
FIG. 1 is a perspective view of an electronic device with its cover being closed as a first embodiment.
Figure 5:
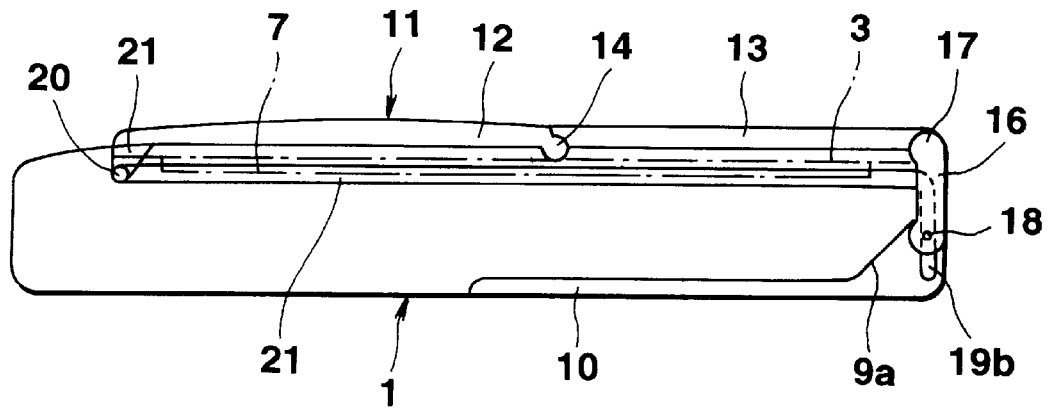
FIG. 5 illustrates, in principle, the structure for opening/closing the cover in the state of the FIG. 1.

In operation, as shown in FIGS. 1 and 5, when the electronic device is not used, the opening 8 in the upper subcase 2 is closed by the cover 11. At this time, first, the first and second cover halves 12 and 13 are extended against the resiliency of the torsion spring 15 to engage the extended first cover half 12 at its left-hand end with the hook 22 provided on the upper subcase 2. More particularly, after the cover 11 is moved leftward in a state where the hook 22 is slightly pushed down against the resiliency of the spring 25, an external force is released from the hook 22 to return same with the resiliency of the spring 25 to thereby engage the raise 22b with the left-hand end of the first cover half 12. Thereafter, the protrusion 26 provided on the side of the first cover half 12 is suppressed with the locker 23 to lock the cover 11. Thus, without floating upward with the resiliency of the torsion spring 15, the cover 11 is locked in a state where the cover 11 has closed the opening 8 in the upper subcase 2. Thus, the cover 11 protects the display unit 7 within the device case 1 to thereby allow the device to be carried about in a safe state.

Figure 2:
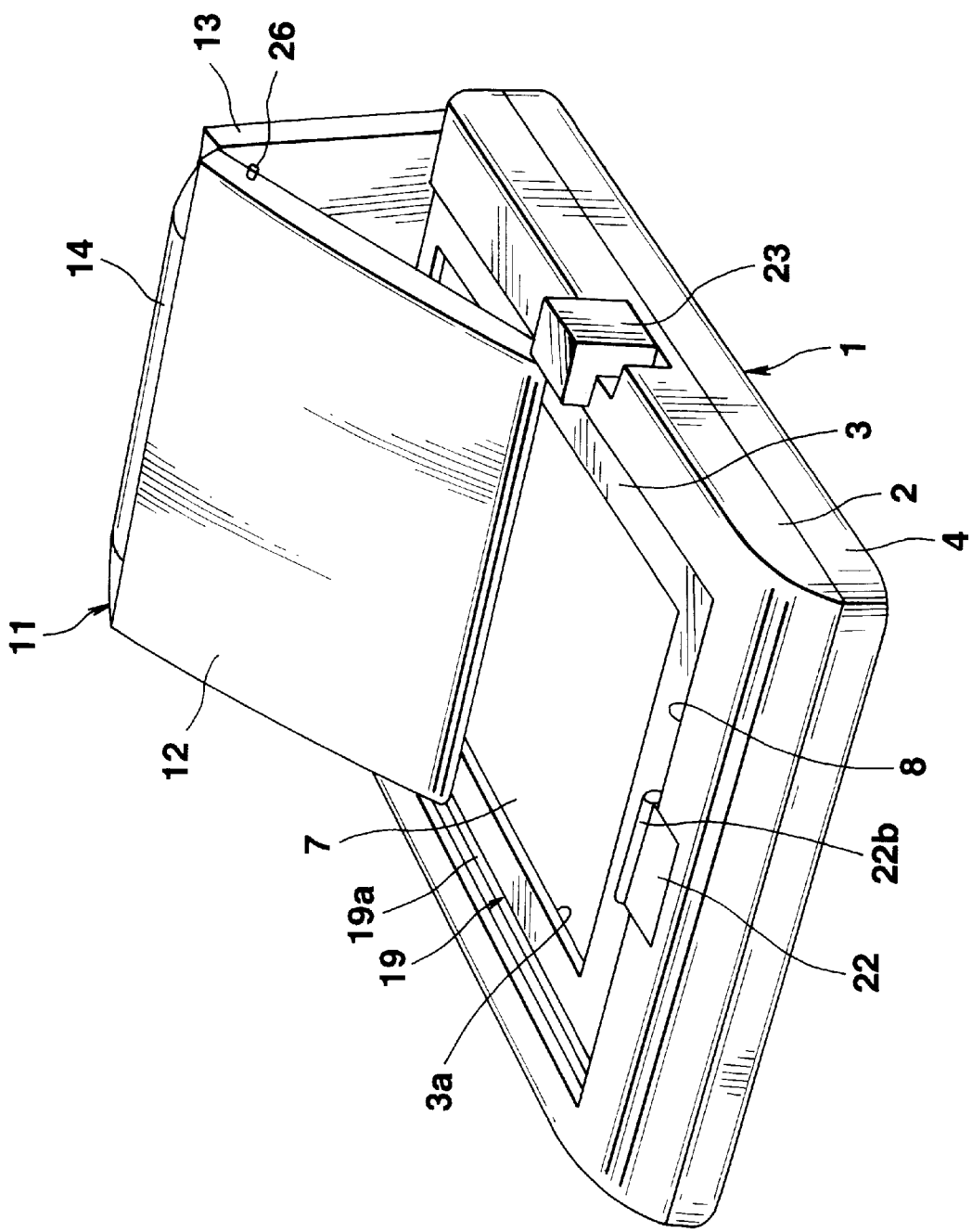
FIG. 2 is a perspective view of the device where the cover starts to open.
Figure 6:
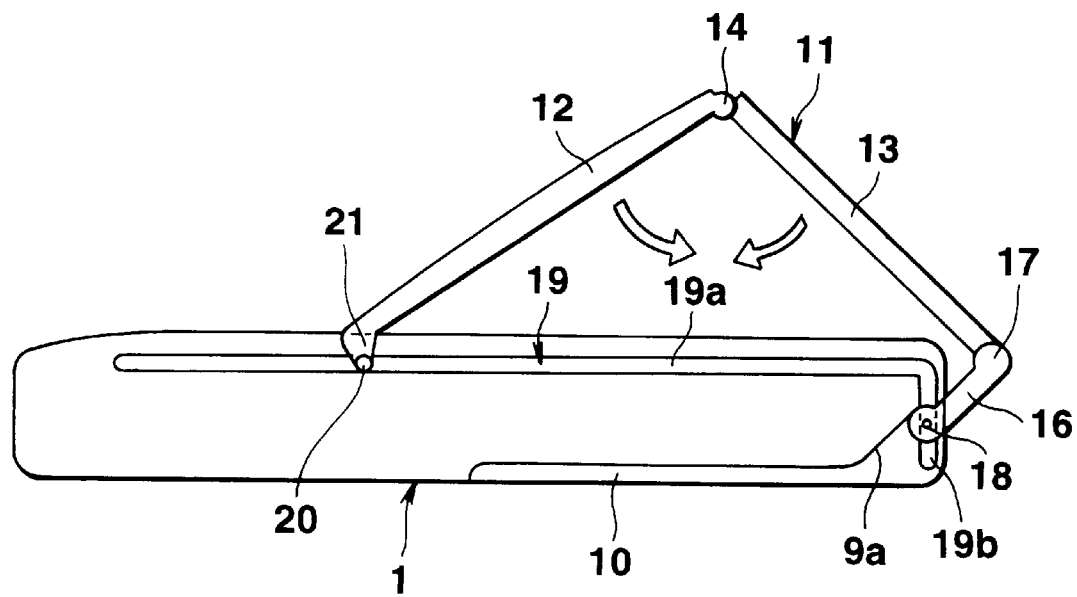
FIG. 6 illustrates, in principle, the structure for opening/closing the cover in the state of the FIG. 2.

When the device is used, the locker 23 is slid to move same from the protrusion 26 on the first cover half 12 to release to the cover 11 from the locker 23. As shown in FIGS. 2 and 6, this turns the first and second cover halves and 12 and 13 around the first hinge 14 so as to come close to each other by the resiliency of the torsion spring 15. At this time, since the resiliency of the torsion spring 15 is larger than that of the spring 25 of the hook 22, the engagement of the hook 22 with the left-hand end of the first cover half 12 is automatically released. Thus, the cover 11 is folded in halves so that the first hinge 14 is positioned up. Therefore, the engaging pins 20 of the first cover half 12 move along the horizontal groove portions 19a of the guide grooves 19 on the case 1, and the turnable plate 16 is pushed by the second cover half 13 to be turned downward around the third hinge 18.

Figure 3:
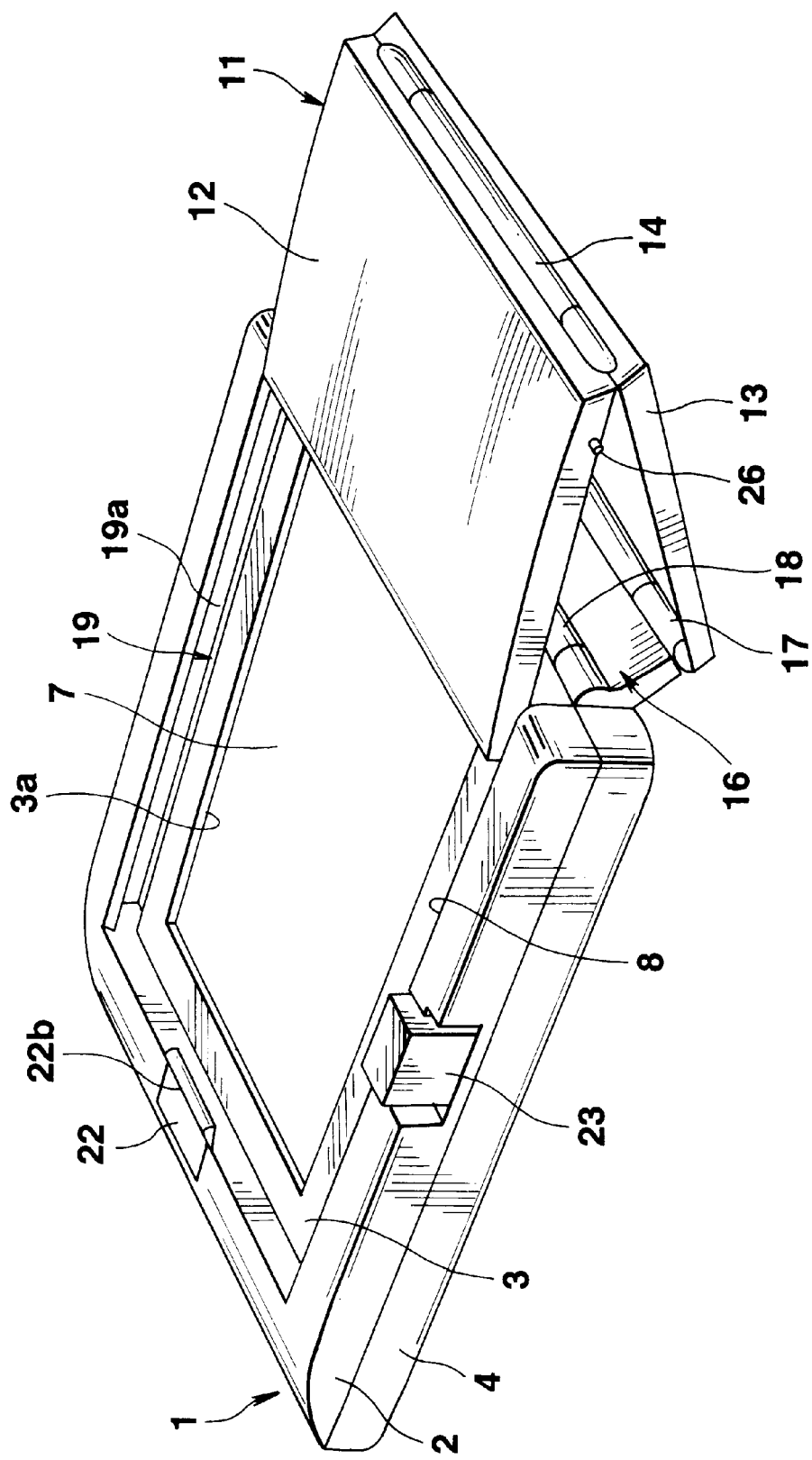
FIG. 3 is a perspective view of the device where the cover is further open.
Figure 7:
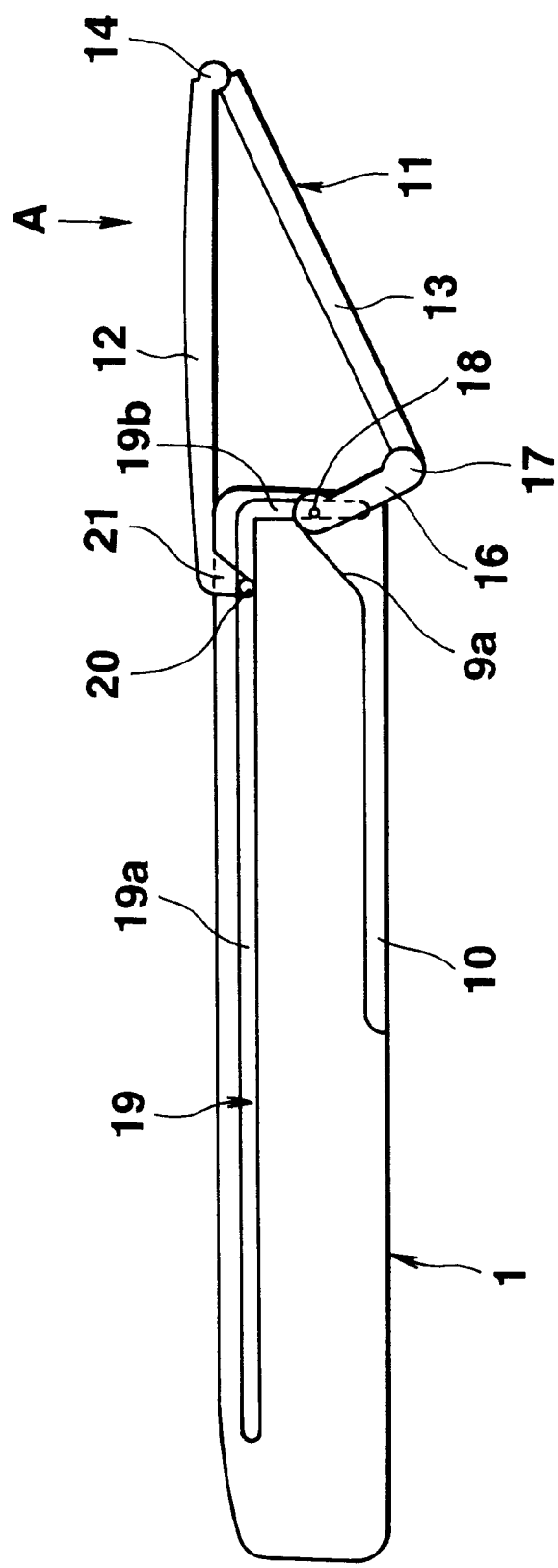
FIG. 7 illustrates, in principle, the structure for opening/closing the cover in the state of the FIG. 3.

When the first and second cover halves 12 and 13 are further turned around the first hinge 14 so as to come close to each other, the cover 11 is folded to a further extent to move toward the right-hand end of the case 1. As shown in FIGS. 3 and 7, the turnable plate 16 further turns so that the folded cover 11 extends rightward from the right-hand end of the case 1 and the engaging pins 20 of the first cover half 12 move toward the right-hand ends of the horizontal guide groove portions 19a. Thus, the display unit 7 within the case 1 appears through the opening 8 in the upper subcase 2. When the engaging pins 20 of the first cover 12 move along the corresponding horizontal groove portions 19a, the lugs 21 on which the engaging pins 20 are provided support the left end of the first cover half 12 above the display unit 7. Thus, the left-hand end of the first half cover 12 moves without contacting with the display unit 7.

Figure 8:
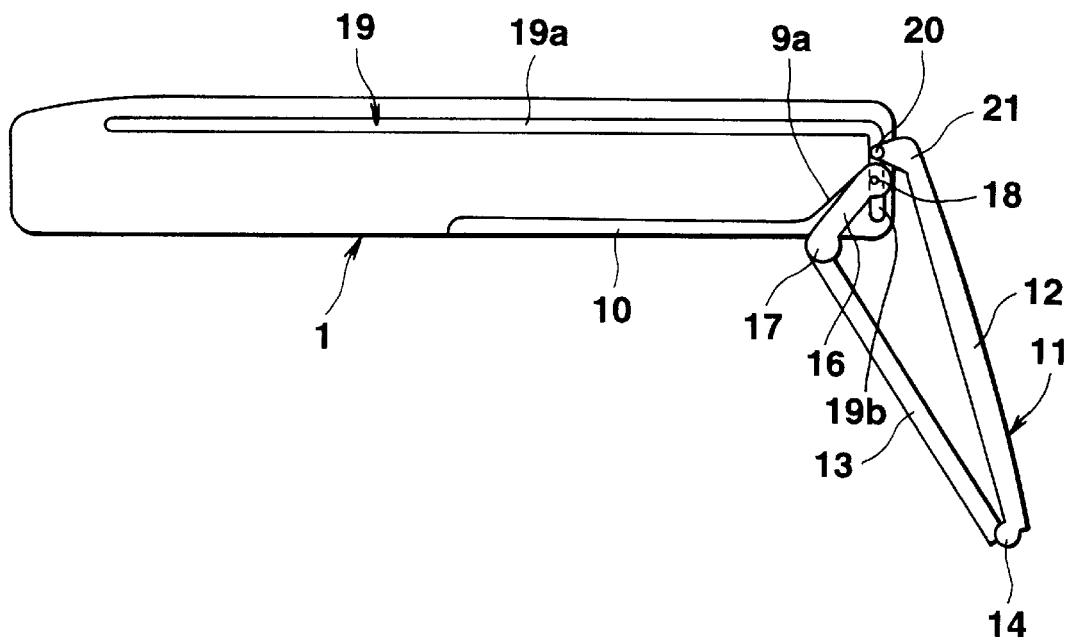
FIG. 8 illustrates, in principle, the case with its cover being pushed down in the state of FIG. 7.

Thereafter, when the user presses the cover 11, which has been folded to extend rightward, from above in the direction of arrow A in FIG. 7, the engaging pins 20 of the first cover half 12 move from the horizontal guide groove portions 19a to the vertical groove portions 19b, as shown in FIG. 8. Thus, the first cover half 12 turns downward. Therefore, the second cover half 13 presses the turnable plate 16 down, so that the turnable plate 16 turns around the third hinge 18 to abut on the tilt surface 9a of the attaching recess 9. Thus, the second hinge 17 is positioned on the receiving recess 10 of the lower subcase 4.

When in this state the cover 11 is pressed toward the lower surface of the lower subcase 4, the engaging pins 20 of the first cover half 12 move along the vertical guide groove portions 19b and the first cover half 12 turns toward the lower surface of the lower subcase 4.

At this time, the engaging pins 20 pass by opposite sides of the third hinge 18, the left-hand end (in FIG. 8, upper end) of the first cover half 12 moves to below the third hinge 18 without contacting with the third hinge 18 by the lugs 21 on which the corresponding engaging pins 20 are provided.

Figure 9:
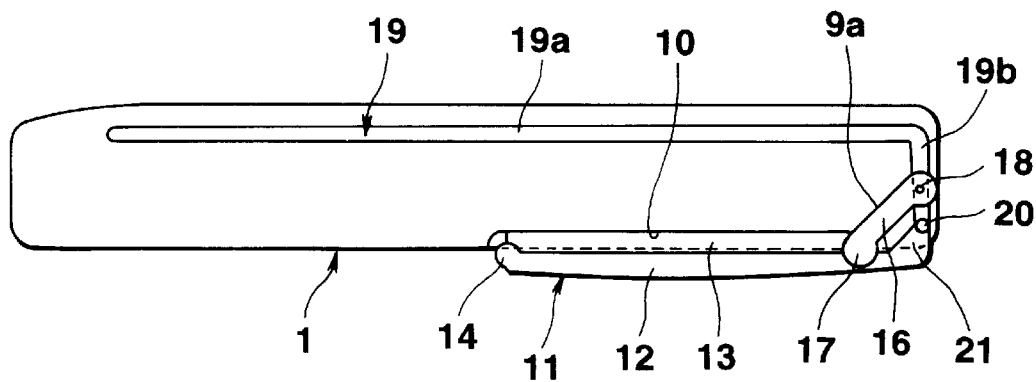
FIG. 9 illustrates the case with its cover being moved to below the case in the FIG. 8 state.

As the first cover half 12 moves, the second cover half 13 is pressed to turn around the second hinge 17, so that as shown in FIG. 9, the folded cover 11 is received within the receiving recess 10 of the lower subcase 4. Although not shown, at this time, the protrusion (not shown) on the receiving recess 10 is engaged in the recess (not shown) on the side of the second cover half 13, and the folded cover 11 is locked within the recess 10. When the cover 11 is closed, operation reverse to that mentioned above is performed.

As described above, in the particular structure for opening/closing the cover 11 for the electronic device, when the cover 11 is closed, the cover 11 shuts the opening 8 in the case 1, so that the cover protects the display unit 7 within the case 1. When the cover 11 is opened, the engaging pins 20 on the cover 11 are guided along the guide grooves 19 in the case 1 and folded upward by the resiliency of the torsion spring 15. The folded cover 11 is moved to below the case 1 through the right-hand end of the case 1 by means of the turnable plate 16 and then received within the receiving recess 10. Thus, when the cover 11 is opened, the cover 11 does not become an obstacle, does not dangle when the cover is open, and is handy. In this case, by placing the electronic device on a desk or using the device by holding same with hands, the open cover 11 is pressed to below the case 1. Thus, the cover 11 is not necessarily required to be locked within the receiving recess 10 by engagement of the protrusion (not shown) on the receiving recess 10 with the recess (not shown) in the second cover half 13.

In the structure for opening/closing the cover 11, the torsion spring 15 is provided on the cover 11 so that the torsion spring 15 biases the cover 11 as to be folded. The resiliency of the torsion spring 15 is set so as to be larger than the engaging force of the engaging hook 22 which is engaged with the left-hand end of the first cover half 12 or the resiliency of the spring 25 of the hook 22. Thus, only by releasing the locked state of the cover 11 by the locker 23, the engagement of the cover 11 with the engaging hook 22 is released automatically by the resiliency of the torsion spring 15 to fold the cover 11 to protrude same rightward from the right-hand side of the case 1. Thereafter, the folded cover 11 is required to be moved to below the case 1 to thereby open the cover 11 easily.

A second embodiment of the structure for opening/closing the case cover according to the invention will be described next with reference to FIGS. 10A–10E. While in the first embodiment the turnable plate 16 is illustrated as movable means, the structure for opening/closing the cover 11 of the second embodiment is provided additionally with a pair of engaging pins 30 at the right-hand end of the cover 11 which is engaged slidably within a corresponding pair of second vertical guide groove portions 31 (shown hatched) provided on the right-hand end of the case 1 in superimposed relationship to the pair of vertical guide groove portions 19b, as shown in FIG. 10A–E.

Figure 10A:
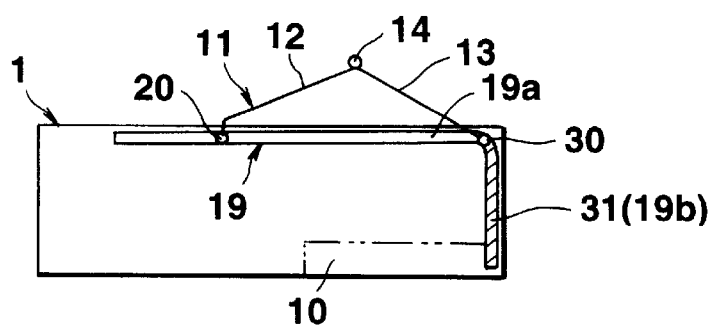
FIG. 10A illustrates, in principle, a cover for an electronic device where the cover started to open as a second embodiment.
Figure 10B:
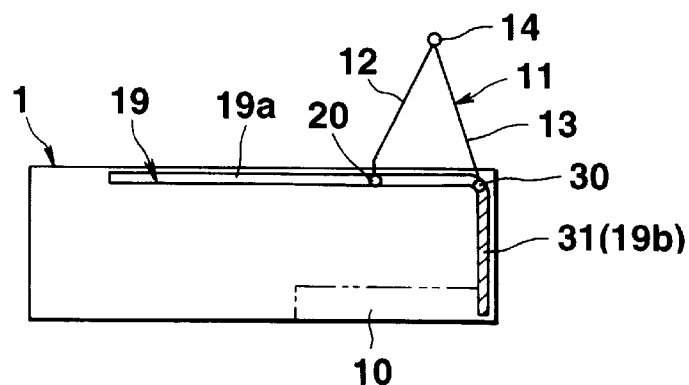
FIG. 10B illustrates that the cover is further opened and folded in halves so as to stand up in the second embodiment.
Figure 10C:
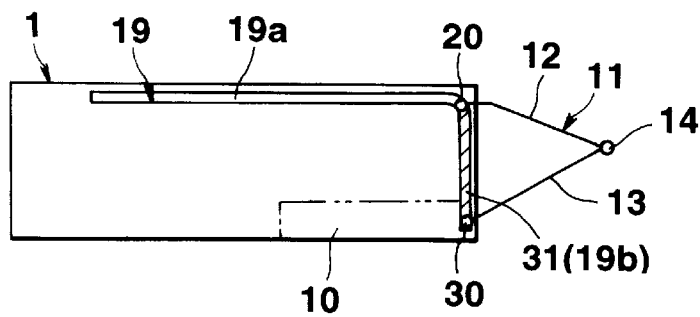
FIG. 10C illustrates that the cover folded in halves protrudes rightward at a right-hand end of the case in the second.
Figure 10D:
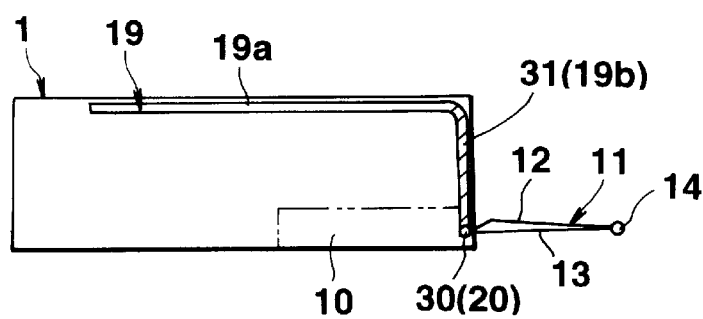
FIG. 10D illustrates the cover completely folded and superimposed at the right-hand edge of the case in the second embodiment.
Figure 10E:
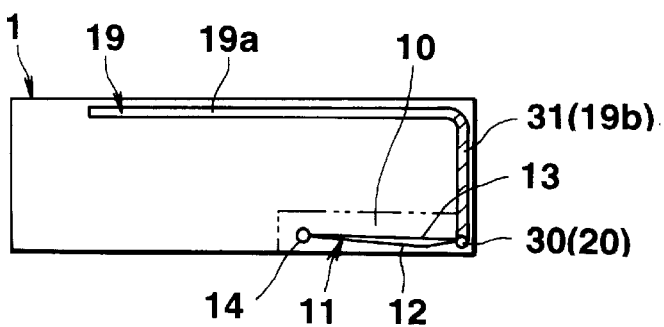
FIG. 10E illustrates the folded cover moved to below the case and received therein in the second embodiment.

When the cover 11 is opened in this structure, the cover 11 is first folded, as shown in FIG. 10A, to stand up folded in the vicinity of the right-hand end of the case 1, as shown in FIG. 10B. Thereafter, as shown in FIG. 10C, the engaging pins 30 at the right-hand end of the cover 11 move down the case 1 along the second vertical guide portions 31 to protrude the folded cover 11 rightward from the right-hand end of the case 1. The left-hand side engaging pins 20 are then moved downward along the vertical guide groove portions 19b to align with the right-hand side engaging pins 30 to thereby fold the cover 11 completely, as shown in FIG. 10D. By the turning the folded cover 11 to below the case 1 around the coinciding engaging pins 20 and 30, as shown in FIG. 10E, the cover 11 is received within the receiving recess 10.

A third embodiment of the invention will be described next with reference to FIGS. 11A–E. In the structure for opening/closing the cover 11 of the third embodiment, a rotating body 32 is provided rotatably around an axle 32a at the right-hand end of the case 1, as shown in FIGS. 11A–E. The cover 11 is supported turnably by a pair of support pins 33 at the right-hand end thereof in a pair of corresponding rightward semi-circular guide grooves (not shown) provided on the rotating body 32. A pair of rightward semi-circular guide groove portions 19c through which the pair of pins 20 slides is also provided on the rotating body 32 in superimposing relationship to the pair of first-mentioned semi-circular guide grooves through which the pair of pins 33 slides so that the pins 20 and 33 can align at the lowest end of the groove portions 19c, as shown in FIG. 11D.

Figure 11A:
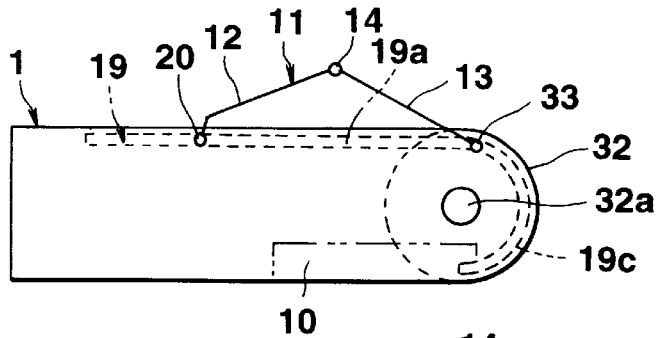
FIG. 11A illustrates, in principle, a cover for an electronic device where the cover started to open as a third embodiment.
Figure 11B:
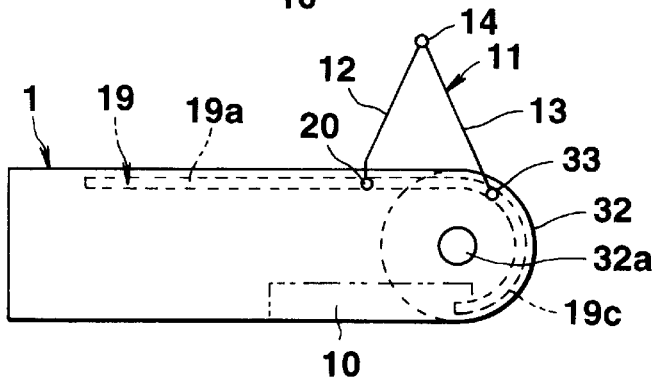
FIG. 11B illustrates that the cover is further opened and folded in halves so as to stand up in the third embodiment.
Figure 11C:
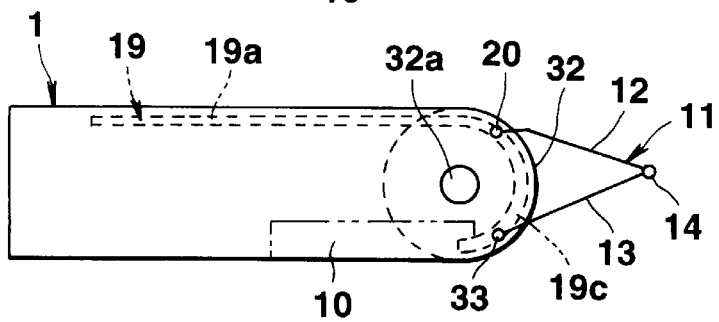
FIG. 11C illustrates that the cover folded in halves protrudes rightward at a right-hand end of the case in the third embodiment.
Figure 11D:
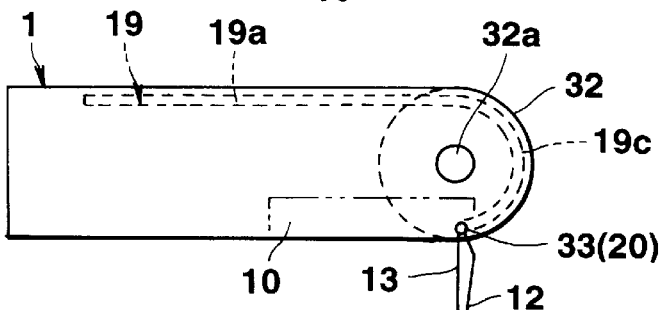
FIG. 11D illustrates the cover completely folded at the right-hand end of the case in the third embodiment.
Figure 11E:
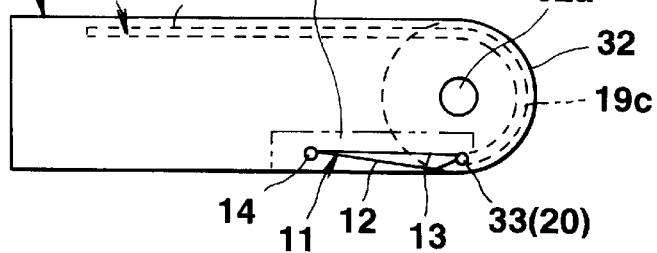
FIG. 11E illustrates the folded cover moved to below the case and received therein in the third embodiment.

When the cover 11 is opened in this embodiment, the cover 11 is first folded as shown in FIG. 11A, and then stands up folded in the vicinity of the right-hand end of the case, as shown in FIG. 11B. Then, as shown in FIG. 11C, the attaching pins 33 of the cover 11 turn the rotating body 32. Along with this rotation, the pins 33 move, and the engaging pins 20 present at the left-hand end of the cover 11 move from the horizontal guide groove portions 19a to the semi-circular guide groove portions 19c to protrude the folded cover 11 rightward from the right-hand end of the case 1. As shown in FIG. 11D, the left-hand engaging pins 20 are then moved downward along the semi-circular guide groove portions 19c to align with the pins 33 to thereby fold the cover 11 completely in halves. In this state, the folded cover 11 is turned to below the case 1 around the aligning pins 20 and 33 to place the cover 11 in the receiving recess 10, as shown in FIG. 11E.

While in the first-third embodiments the cover is illustrated as applied to the mobile or portable electronic devices, the present invention is not limited to those particular cases. For example, the invention is applicable widely to the structures for opening/closing covers for electronic devices such as portable telephone, jewel boxes and/or music boxes.

What is claimed is:

1. A structure for opening/closing an opening in an upper surface of a case, comprising:

a cover foldable in halves around a connection, the cover having one end and another end, a hinge provided at an end of the case and to which the cover is movably coupled at its one end;

engaging pins provided at the other end of the cover for slidably engaging the other end of the cover and the case; and a guide groove disposed on the case for guiding the engaging pins along the upper surface of the case;

whereby the cover is folded in halves upward about the connection as the engaging pins are guided by the guide groove, moved to below the case via the end of the case by the hinge, and then disposed below the case in a state where the cover is folded in halves.

2. The structure according to claim 1, wherein the hinge comprises a turnable plate which couples the end of the case to the one end of the cover, and wherein when the cover is opened the turnable plate is rotated downward around one end of the turnable plate so as to abut on a lower portion of the case and the cover is folded completely at a curve which composes the other end of the turnable plate and then moved to below the case.

3. The structure according to claim 2, further comprising a spring provided on the cover for biasing the cover so as to fold the cover in halves upward at the connection.

4. The structure according to claim 3, further comprising a lock provided on the case for locking the cover when the cover closes the opening in the case.

5. The structure according to claim 2, further comprising a lock provided on the case for locking the cover when the cover closes the opening in the case.

6. The structure according to claim 1, further comprising a lockspring means provided on the cover for biasing the cover so as to fold the cover in halves upward at the connection.

7. The structure according to claim 6, further comprising a lock provided on the case for locking the cover when the cover closes the opening in the case.

8. The structure according to claim 1, further comprising a lock provided on the case for locking the cover when the cover closes the opening in the case.

9. The structure according to claim 1, further comprising a display unit provided in the opening of the case so as to be protected by the cover.

10. The structure according to claim 1, wherein when the cover moves to a portion below the case, the cover is disposed in a receiving recess provided on the case.

11. The structure according to claim 10, further comprising a lock for locking the cover disposed in the receiving recess.

12. A structure for opening/closing an opening in an upper surface of a case, the structure comprising:

a guide groove provided on the case and operatively engaging pins, the guide groove guiding the engaging pins along an upper surface of the case and along a surface of one end of the case;

a cover comprising:

a first cover half having at one end the engaging pins, the first cover half having an other end; and a second cover half having at one end a connection for coupling the second cover half to the other end of the first cover half, the second cover half having an other end; and a turnable plate coupling the other end of the second cover half to the case;

whereby the cover is folded upward in halves at the connection as the engaging pins are guided by the guide groove, and when the turnable plate is rotated about the case to abut on a lower surface of the case, the folded cover is moved to below the case and disposed in a state where the cover is folded in halves.

13. An electronic apparatus having a structure which opens/closes a cover of an opening in an upper surface of a case thereof, the cover being foldable in halves around a connection and having one end and an other end, the structure comprising:

a hinge provided at an end of the case and to which the cover is movably coupled at its one end;

engaging pins provided at the other end of the cover for slideable engagement with the case; and a guide groove provided on the case for guiding the engaging pins along an upper surface of the case and a surface of the one end of the case at which the engaging pins are provided;

whereby the cover is folded in halves upward at the connection as the engaging pins are guided by the guide groove, moved to below the case via the one end of the case by the hinge, and then disposed below the case in a state where the cover is folded in halves.

* * * * *